Patented Jan. 13, 1931

1,789,279

UNITED STATES PATENT OFFICE

DANIEL ZINNER, OF SOUTH MILWAUKEE, WISCONSIN, ASSIGNOR, BY MESNE ASSIGNMENTS, TO NEWPORT CHEMICAL CORPORATION, A CORPORATION OF DELAWARE

AZO DYESTUFFS AND PROCESS OF PREPARATION

No Drawing.  Application filed July 2, 1928. Serial No. 290,043.

This invention relates to azo dyestuffs and to a process of preparing the same. The dyestuffs of this invention dye wool in yellowish orange to reddish orange tints characterized by their good fastness properties to light and to milling.

It is accordingly an object of this invention to provide azo dyestuffs for dyeing wool in clear orange shades varying from a yellowish orange to a reddish orange which are fast to light and to milling.

Other and further important objects will become apparent from the following disclosures in the examples and appended claims.

The dyestuffs of my invention according to the method of synthesis most probably have the following general structural formula:

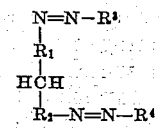

wherein $R_1$ and $R_2$ are benzene nuclei, $R^3$ is a pyrazolone group and $R^4$ is a naphthol or naphthol sulfonic acid. The tetrazo components employed are prepared from 4.4'-diamino-diphenyl-methanes which may be prepared from an amine and formaldehyde in an acid solution by the use of ½ mole of formaldehyde to 1 mole of amine. See method of German Patent No. 70,402 or German Patent No. 53,937. They are not the so-called anhydro bases prepared by the use of 1 mole of the amine to 1 mole of formaldehyde as in German Patents 83,544, 93,540, 95,600, 96,851 and 96,852.

The group $R^3$ in the above formula is a pyrazolone group, the aromatic nucleus of which may be substituted by such groups as halogen, methyl, alkoxy, sulfonic acids and the like. The group $R^4$ in the above formula is a naphthol or a naphthol sulfonic acid.

By a variation in the use of the above coupling components the shade of the dyestuff may be varied in general from a yellowish orange to a reddish orange. To give the dyestuff a proper solubility for dyeing wool, there must be present in the molecule at least one acid group as for example, an $SO_3H$ group. The latter may be present on either of the coupling components or on the tetrazo component.

The diamino-diphenyl-methanes have most probably the following general formula:

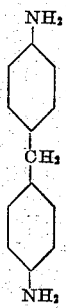

in which the hydrogen on the benzene rings may be substituted by such groups as methyl, halogen, alkoxy, sulfonic acid groups and the like.

Without limiting my invention to any particular procedure, the following example in which parts by weight are given, will serve to illustrate my method in its preferred form, which method produces a compound having the following structure:

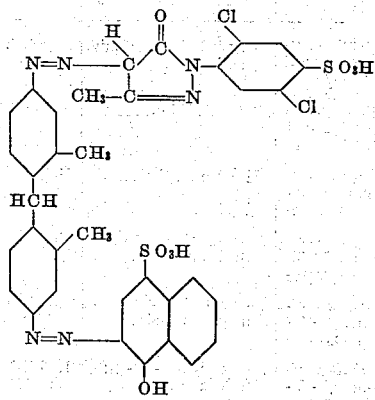

22.6 parts of 4.4'-diamino-2.2'-dimethyl diphenyl methane are tetrazotized in the usual manner with 13.8 parts of sodium nitrite and 68 parts of hydrochloric acid 20° Bé. at a temperature of 0 to 5° C. The tetrazo solution is then neutralized by the addition of sodium carbonate or sodium bicarbonate. To this neutralized tetrazo solution is added an alkaline solution of 32.3 parts of 1(2'-5'-dichloro-p'-sulfo-)-phenyl-3-methyl-5 pyrazolone. While the coupling is progressing, there is run into the coupling mass a solution of sodium carbonate until the mass becomes distinctly alkaline. To this intermediate product is then added an alkaline solution containing 24.6 parts of 1-naphthol-4- sulfonic acid (Neville-Winther's acid). The color changes from a yellow to an orange shade and the coupling is practically complete in a few hours. The mass is salted to 20° Bé. with common salt and heated to 80° C. After cooling somewhat, the dyestuff is filtered off and dried. It is an orange colored product which dyes wool from an acid or neutral bath bright orange shades remarkably fast to light and milling.

If instead of using 1-naphthol-4-sulphonic acid (Neville-Winther's acid), beta- or alpha-naphthol is used, a much yellower shade of orange is obtained. If the first coupling component is substituted by other pyrazolones, as for example, phenyl-methyl-pyrazolone or the pyrazolone made from a xylidine sulfonic acid or an anisidine sulfonic acid the shade becomes a redder orange. In case a 4.4′-diamino-diphenyl-methane sulfonic acid is employed then the coupling components do not necessarily have to have a sulfonic acid group on them. Other 4.4′-diamino-diphenyl-methanes may be employed in the above manner to produce a variety of shades on wool fast to light and milling.

Below is a table showing the variation in shades using varying coupling components on 4.4′ diamino-2.2′-dimethyl-diphenyl-methane.

| Coupling components | | Shade |
|---|---|---|
| 1 | 2 | |
| 1-(2′-5′-dichloro-4′-sulfo-)-phenyl-3-methyl-5-pyrazolone. | 1-naphthol-4-sulfonic acid. | Reddish orange. |
| 1-(2′-5′-dichloro-4′-sulfo-)-phenyl-3-methyl-5-pyrazolone. | Beta naphthol | Yellowish orange. |
| 1-(2′-5′-dichloro-4′-sulfo-)-phenyl-3-methyl-5-pyrazolone. | Alpha naphthol | Yellowish orange. |
| 1-(2′-5′-dichloro-4′-sulfo-)-phenyl-3-methyl-5-pyrazolone. | 2-naphthol-6-8-disulfonic acid. | Yellowish orange. |
| 1-(2′-5′-dichloro-4′-sulfo-)-phenyl-3-methyl-5-pyrazolone. | 2-naphthol-3-6-disulfonic acid. | Reddish orange. |
| 1-(2′-5′-dichloro-4′-sulfo-)-phenyl-3-methyl-5-pyrazolone. | 2-naphthol-6-sulfonic acid. | Reddish orange. |
| 1-(2′-5′-dichloro-4′-sulfo-)-phenyl-3-methyl-5-pyrazolone. | 2-naphthol-7-sulfonic acid. | Reddish orange. |
| 1-(2′-5′-dichloro-4′-sulfo-)-phenyl-3-methyl-5-pyrazolone. | 1-naphthol-5-sulfonic acid. | Reddish orange. |
| 1-(2′-5′-dichloro-4′-sulfo-)-phenyl-3-methyl-5-pyrazolone. | 2-amino-5-naphthol-7-sulfonic acid. | Reddish orange. |
| 1-(2′-5′-dichloro-4′-sulfo-)-phenyl-3-methyl-5-pyrazolone. | 2-benzoyl amino-5-naphthol-7-sulfonic acid. | Reddish orange. |
| 1-(2′-5′-dichloro-4′-sulfo-)-phenyl-3-methyl-5-pyrazolone. | 2-amino-8-naphthol-6-sulfonic acid. | Brown. |
| 1-phenyl-3-methyl-5-pyrazolone. | 1-naphthol-4-sulfonic acid. | Reddish orange. |

Pyrazolones from xylidine and anisidine all give reddish orange shades on the above mentioned second components.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing azo dyestuffs, which comprises coupling a tetrazotized 4,4′-diamino diphenyl methane body with a pyrazolone body and with a naphthol body.

2. As new articles of manufacture, azo dyes of the following general formula:

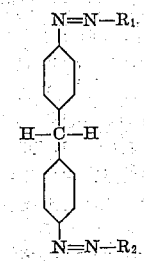

containing at least one sulfonic acid group in the molecule, in which the hydrogen atoms on the benzene rings may be substituted by alkyl, alkoxy, halogen, sulfonic groups and the like and in which $R_1$ is a pyrazolone body and $R_2$ a naphthol body, which dyes in general dye wool in clear orange shades varying from yellowish orange to reddish orange and are fast to light and milling.

3. As new articles of manufacture, materials dyed with the dyestuffs of claim 2.

4. The process of preparing azo dyestuffs, which comprises coupling tetrazotized 4-4′-diamino-2-2′-dimethyl-diphenyl-methane with 1-(2′-5′-dichloro-4′-sulfo-)-phenyl-3-methyl-5 pyrazolone, and a naphthol body.

5. As new articles of manufacture, azo dyestuffs having most probably the following structural formula:

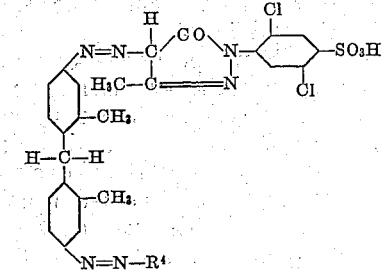

in which the group $R^4$ is a naphthol group.

6. As new articles of manufacture, materials dyed with the dyestuffs of claim 5.

7. The process of preparing azo dyestuffs which comprises coupling tetrazotized 4-4′-diamino 2-2′-dimethyl-diphenyl methane with 1-naphthol-4-sulfonic acid and a pyrazolone compound.

8. As new articles of manufacture, azo dyestuffs having most probably the following structural formula:

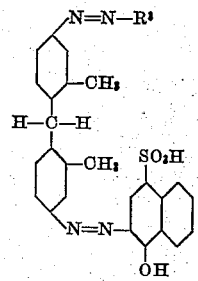

in which $R^3$ is a pyrazolone body.

9. As new articles of manufacture, materials dyed with the dyestuffs of claim 8.

10. The process of preparing an azo dyestuff, which comprises coupling tetrazotized 4-4'-diamino-2-2'-dimethyl-diphenyl-methane with 1-(2'-5'-dichloro-4'-sulfo-)-phenyl-3-methyl-5 pyrazolone, and 1-naphthol-4-sulfonic acid.

11. As a new article of manufacture, an azo dyestuff having most probably the following structural formula:

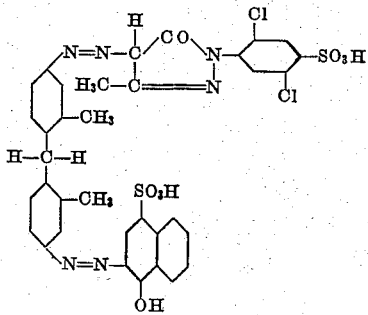

12. As new articles of manufacture, materials dyed with the dyestuff of claim 11.

In testimony whereof I have hereunto subscribed my name at Carrollville, Milwaukee County, Wisconsin.

DANIEL ZINNER.